United States Patent [19]

Wong

[11] Patent Number: 4,827,873

[45] Date of Patent: May 9, 1989

[54] SUPPORT DEVICES FOR PRODUCING VARIABLE HEIGHT BARRIERS

[76] Inventor: William P. W. Wong, 3030 Montrose Ave., La Crescenta, Calif. 01214

[21] Appl. No.: 61,658

[22] Filed: Jun. 15, 1987

[51] Int. Cl.⁴ ............................................. A01K 15/00
[52] U.S. Cl. ...................................................... 119/29
[58] Field of Search ............... 119/29, 61, 5; 272/103, 272/113; 54/71, 84; 182/181

[56] References Cited

U.S. PATENT DOCUMENTS

| | | | |
|---|---|---|---|
| 493,479 | 3/1893 | Carl | 182/181 |
| 1,408,675 | 3/1922 | Wimberg | 182/181 |
| 4,071,113 | 1/1978 | Pelser | 182/181 |
| 4,190,001 | 2/1980 | Cecala | 182/181 |
| 4,239,168 | 12/1980 | Colonna des Princes | 119/29 |

FOREIGN PATENT DOCUMENTS

| | | | |
|---|---|---|---|
| 2604388 | 8/1977 | Denmark | 119/29 |
| 36033 | 9/1981 | Fed. Rep. of Germany | 119/29 |

Primary Examiner—John J. Wilson
Assistant Examiner—R. Thomas Price
Attorney, Agent, or Firm—G. Donald Weber, Jr.

[57] ABSTRACT

A support device for supporting a rod or pole which is to be spaced above a prescribed surface such as the ground. The support device is substantially rectilinear in peripheral configuration. The support device includes substantially diagonal strut portions which are offset from the true diagonal of the rectilinear support device and which form a support area which receives the rod or pole to be supported. By placing the support device on different sides thereof, the support area and, thus, the rod or pole, is displaced a different distance from the surface.

18 Claims, 2 Drawing Sheets

SUPPORT DEVICES FOR PRODUCING VARIABLE HEIGHT BARRIERS

BACKGROUND

1. Field of the Invention

This invention is directed, in general, to support devices for supporting a rod or pole at a variable heighth. In a particular application, the invention can be used as a cavaletti for equestrian sports or training.

2. Prior Art

A type of fence or barrier for equestrian sports or training comprises, generally, one or more horizontally extending poles, supported at each end. In the past, the pole or poles were supported by, for example, rigid pillars or posts, by empty barrels, or the like. However, if a horse stumbled or fell and the horse or the rider hit such a pillar, post or barrel, serious injury could result. This type of accident is particularly likely to occur with young horses undergoing training.

This crude type of barrier was eventually replaced by a training device referred to as a caveletti which, it is reported, was originally developed in Italy by Caprilli. Cavaletti are frequently used in dressage and jumping training, as well as in competitions. A set of cavaletti can be stacked or arranged in many ways to form jumping obstacles of different heighths.

Conventional cavaletti consist of two wooden cross-members as side supports with a rod or pole connected between the crosses. Typically, the ends of the transverse member are each attached to one fork of one of the wooden cross-members. When the transverse member rests only in linear contact against the forks of the wooden cross-members, the connection of the transverse member and the wooden cross-members is not very stable. Of course, the transverse member can be attached to the cross-members in any suitable fashion.

With the transverse member being suitably attached to the cross-members, this kind of cavaletti can be placed in three positions by turning the cross-members. In the different positions, the transverse member is arranged to have a different height.

To achieve other height characteristics the caveletti can be stacked upon each other. However, when the cavaletti are stacked upon each other, only the ends of the wooden cross-members lie one upon the other. Thus, the slightest bump or touch causes the cavaletti to be displaced and the stack collapses because of the small contact surface of the cross-members of the cavaletti.

A disadvantage of these cavaletti is that they are not very high. Consequently, it is necessary to stack a number of these cavaletti to achieve an acceptable barrier height. If a jumping obstacle consists of this type of cavaletti, the danger of collapsing when bumped is great. This can cause injury to the horse and/or rider. Also, it is a disadvantage in that the jumping course is blocked for some time while the stack is rebuilt.

Another disadvantage of this criss-cross device is that lines and tethers can easily become entangled with the side supports. This condition can be dangerous to the horse and rider.

Another kind of cavaletti construction is known, in which the side supports consist of horizontal planks. On the upper side of these planks is at least one semi-circular recess into which the ends of the transverse member are placed. Pedestals can be fixed to the bottoms of the planks to adjust the height of the transverse member. The height of the pedestals corresponds at least to the radius of the transverse member so that the cavaletti can be stacked.

This type of cavaletti has the disadvantage that it can be placed in only two positions of different heights, viz. with the transverse member on the top of the plank or with the transverse member on the ground.

Another type of cavaletti which is described in United Kingdom Pat. No. 1,561,869 discloses a device in the form of a horizontal pole, each end of which is permanently secured, by screwing or mortising, to a rectangular support plate disposed perpendicularly to the length of the pole. Each rectangular support plate has a semi-circular recess in the middle of each of its circumferential sides. The end of the pole is securely fastened in one of these recesses, with one half of the cross section of the pole received in the recess and the other half protruding. To vary the height of the pole, the cavaletti is rotated about the length of the pole. Thus, the sides of the two plates to which the pole is attached may face upwards, downwards, or to either side so that the pole is at a high, low or intermediate height. One or more such cavaletti may be used to build a horse jump.

Another type of caveletti is shown and described in U.S. Pat. No. 4,414,920. In this device a three-dimensional rectangular block includes grooves for loosely receiving the transverse members or poles.

Reference is also made to a number of books or similar publications which are directed to horse training or the like. These publications refer to various aspects of cavaletti construction and usage.

One publication is "Basic Training of the Young Horse", by Reiner Kimke; J.A. Allen and Company, Ltd., 1985. Chapter 13 of this book is entitled Caveletti Work.

Another publication is "Practical Eventing", by Sally O'Connor, U.S. Combined Training Association, Inc. Chapter 3 of this publication is entitled "Beginning Jumping Work" and shows a caveletti construction.

Another publication is "Training Showjumpers" by Anthony Paalman, J.A. Allen Company, Ltd. 1984.

PRIOR ART STATEMENT

In a search of the prior art, the following patents have been discovered. These patents are listed in descending numerical order for convenience.

U.S. Pat. No. 4,414,920; BLOCK FOR SUPPORTING THE POLES OF EQUESTROAN FENCES; Richards et al. This patent is directed to a block for use in supporting one end of an equestrian fence pole. Each face of the block has a groove for receiving one end of the pole. The three dimensions of the block are all different so that a pole can be supported at three different heights.

U.S. Pat. No. 4,239,168; RETAINING DEVICE FOR AN OBSTACLE RAIL; Colonna. This patent is directed to a retaining device for each end of a fence rail of the type used in horse jumping contests. It comprises a mounting piece and a bracket having two pins which can be inserted in an adjustable position in the holes of each side post. The mounting piece carries a U-shaped rail support which is capable of pivotal displacement about the pin of either a single or double hinge. The rail can be accurately positioned but falls freely when struck.

U.S. Pat. No. 4,199,138; GYMNASTICS AND GAME APPARATUS; Kaiser. This patent is directed to a gymnastics and game apparatus formed of a plurality of large-scale structural members made of plastic material in a box-shaped, elongated configuration and having patterns of recesses in the form of mortise openings and grooves in at least two opposite longitudinal lateral walls.

French Pat. No. 2,161,720; OBSTACLE; Wiegner. This patent is directed to an obstacle formed of plastic and used to provide a barrier.

British Pat. No. 1,561,869; CAVALETTI FOR HORSE SHOW-JUMPING; Gerhard et al. This patent is directed to a cavaletti for horses and includes a block having grooves in the four surfaces thereof for receiving poles or rods. The blocks can be stacked to provide different heights for the poles or rods which are supported thereby.

The publications referred to in the BACKGROUND section are included herein by reference.

SUMMARY OF THE INSTANT INVENTION

This invention is directed to a support structure which can be used as, inter alia, a cavaletti type support. The support apparatus is made of any suitable material such as a type of high impact plastic or the like. The support device is rectilinear and has a generally square outer periphery. The thickness of the device is sufficient to permit the square block arrangement to stand in an upright position on any one of the sides thereof.

A pair of diagonal strut members are provided. The diagonal strut members are three dimensional through the support device and are arranged to be offset from the true diagonals of the square block. The square block is produced by interconnecting the ends of the strut members.

A support mechanism is provided at one intersection of the pair of diagonal strut members. Because of the offset of the diagonal strut members relative to the square block, the support mechanism is also offset from the center of the block in such a fashion that it can be selectively disposed at four (4) different heights from a support surface. These heights are separately produced by each position of the square block.

In addition, a near-centrally-located bin or storage area is provided in the apparatus. A lid or cover can be selectively attached to this bin. Thus, appropriate weight materials such as sand, metal pellets or the like can be placed in the bin and retained therein by the lid to add stabilizing weight to the support device.

DESCRIPTION OF PREFERRED EMBODIMENTS

Figure 1:
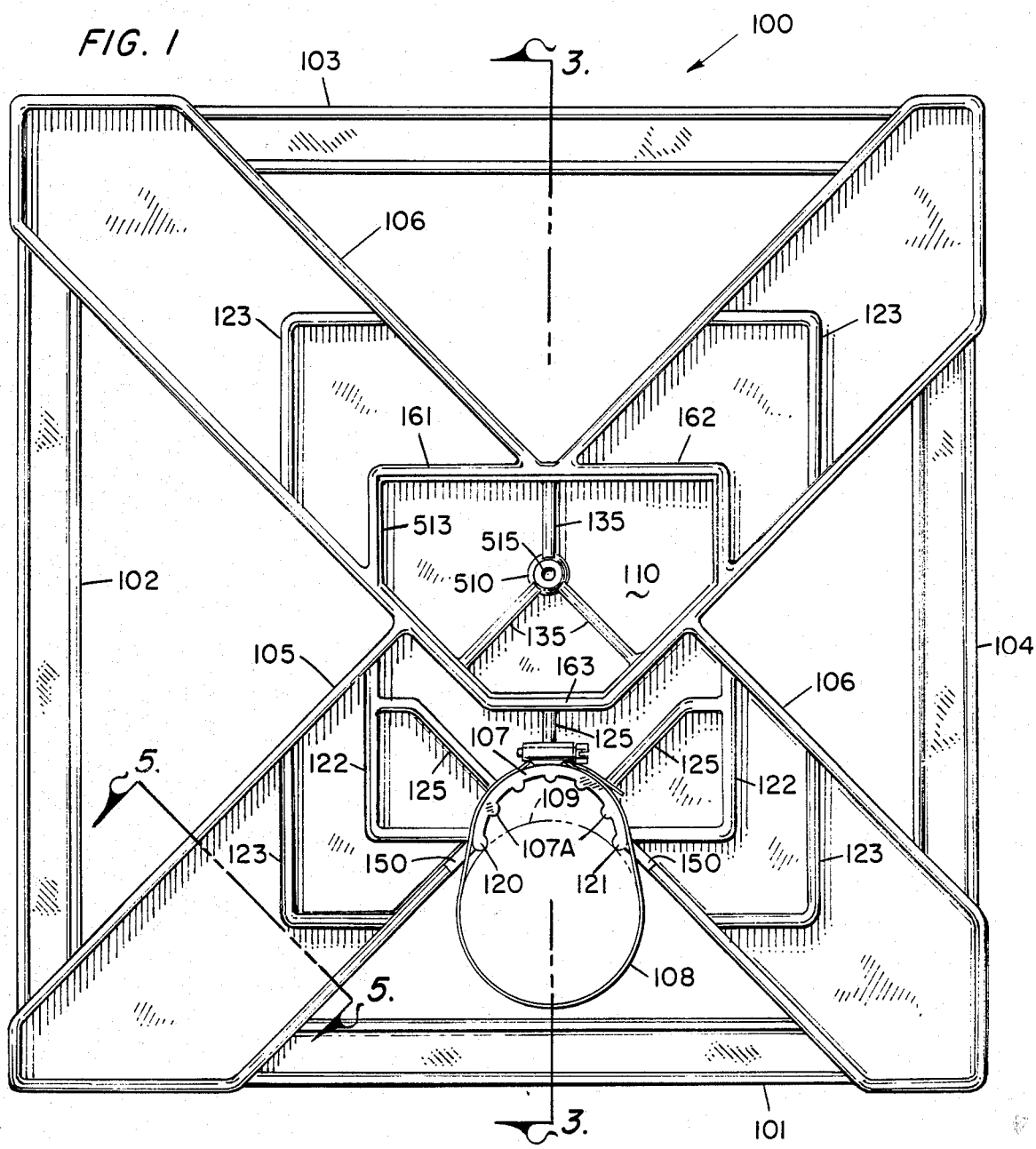
FIG. 1 is a paln vbiew of the supporti apparatus of the instant invention.

Referring now to FIG. 1, there is shown a plan view of the support device 100 of the instant invention. It is seen that the device or block 100 shown in FIG. 1 is substantially square at its outer peripheral configuration. That is, each of the four outer sides is of the same length.

The block according to the invention is typically made of a plastic material such as high density polyethylene which can be fiber-reinforced or include other reinforcements, although the invention is not limited to this material.

The block 100 includes two substantially diagonal strut members 105 and 106. These struts are the main support portion of the structure. In the preferred embodiment, struts 105 and 106 each take the shape of an I-beam with two parallel plates joined at their midpoints by another plate or web which is perpendicular thereto. The struts extend to the opposite corners of the block 100 and, essentially, intersect near the center of the device 100. In the preferred embodiment, the diagonal struts intersect at an angle of approximately 90° to each other.

It is also noted that, in the preferred embodiment, each of the side rails 101 through 104 is of a generally I-beam or T-beam configuration. That is, each of these side bars or side rails has two parallel plate-like members with a perpendicular plate or web which is joined to the midpoint of each of the parallel plates. In the preferred embodiment, the outer plate of the side rails 101 through 104 is wider than the inner plate. The invention is not limited to this particular construction.

The side rails 101–104 provide several advantages for the invention. For example, the side rails provide a strength factor. That is, the side rails prevent the ends of the criss-crossed struts 105 and 106 from spreading apart under the weight of the transverse member 109 (shown dashed and described infra).

Also, the side rails 101–104 prevent lines, cables or the from becoming caught or entangled with or between the struts 105 and 106. Thus, a dangerous condition found in virtually every known X-shaped cavaletti is avoided.

The diagonal strut members 105 and 106 have a heighth which is defined by the parallel plates thereof. In the embodiment shown, the heighth of both of these plates is the same (i.e. an I-beam configuration). Conversely, the parallel plates of the side rails 101 through 105 may be of different heights. Moreover, the heighth of the plates of side rails 101–104 are different from the heighth of the parallel plates of the struts 105 and 106.

In addition, the diagonal struts 105 and 106 have a width which is defined by the web portion thereof. The width of struts 105 and 106 are the same. Likewise, the width of the web of side rails 101 through 104 is the same. However, the width of the side rails is smaller than the width of struts 105 and 106.

It is clear that by shifting the width of diagonal struts 105 and 106 upwardly and/or downwardly relative to the true diagonal of the block device 100, an offset diagonal relationship is obtained. In other words, the center line of the strut width does not coincide with the diagonal of the block 100. For example, the diagonal strut 105 has a relationship wherein approximately 25% of the width of diagonal strut 105 is on one side of the true diagonal and approximately 75% of the strut 105 is one the other side of the diagonal. On the other hand, the diagonal strut 106 has approximately 60% of the strut width on one side of the true diagonal and 40% on the other side of the true diagonal.

Thus, each of the diagonal struts 105 and 106 is offset relative to the actual center of the support device block 100. As a consequence, the intersection of these diagonal struts is also offset from the true center of the device 100. Moreover, because of the offset of the diagonal struts 105 and 106, the intersection thereof is offset by different dimensions in each direction relative to the true center of the device 100. In essence, the device 100 is asymmetrical about the centerlines and the diagonals thereof. Therefore, the intersection of the struts has a different dimension or distance to each of the side rails. As a consequence, the distance from the ground to the support 107 depends upon which side rail is placed on the ground.

A support component 107 has an open, substantially C-shaped or cup-shaped configuration and is formed adjacent to the intersection of the diagonal struts 105 and 106. In particular, the support component 107 is disposed at or adjacent that portion of the intersection of the struts which has the smallest dimension normal to the side rail. In this instance, the support component 107 is disposed between the portions of struts 105 and 106 which are adjacent to the side rail 101. The support 107 has the same length as the heighth of the parallel plates of struts 105 and 106.

The support component or through 107 may include a plurality of ribs 107A which are, preferrably, semi-cylindrical in configuration. The ribs 107A extend along the length of trough 107 and provide additional strength to the device but may be omitted if so desired. Also, the end points 120 and 121 or cylindrical beads are used to support the pole or rod 109 on a two-point support principle. That is, any shape can be conveniently accommodated by a two-point support.

A clamp 108 is arranged to be mounted over or on the outer surface of the trough 107. Typically, clamp 108 can be mounted on one side of trough 107. In one embodiment, clamp 108 has the form of a hose clamp which passes around the trough 107 and through the slots 150. The slots 150 are recessed portions in the parallel plates of struts 105 and 106 and are adopted to receive the clamp 108. The clamp (or band) is operative to engage and maintain the pole or shaft 109 within the trough 107. This retention condition can be effected with a desired degree of rigidity and security. Moreover, clamp or band 108 is able to secure poles of various sizes, shapes and of irregular configurations. In one embodiment, the clamp or straps are fabricated of SST steel. As shown in FIG. 1, clamp 108 operates to support or retain the exemplary pole 109. Moreover, a pair of clamps can be used; one on each end of trough 107. This is permissible because the two main surfaces of block 100 are substantially similar.

A suitable hollow box 110 or bin arrangement is provided at the intersection of the diagonal struts 105 and 106. In the embodiment shown in FIG. 1, the box 110 is a multi-sided bin or container which is incorporated into the inner section of the struts 105 and 106. Typically, the walls or sides 161, 162 and 163 of the container box 110 are of the same height as the parallel plates or flanges of the struts 105 and 106 and may be contiguous therewith. Thus, a lid or cover 511 (see FIG. 3) can be easily placed over the box 110 to form an enclosure. The lid can be mounted to the structure by means of a self-tapping screw 512 which passes through the lid 511 (see FIG. 3) and which is threadedly engaged to the boss 510. As discussed, appropriate weighting material such as sand, metal pellets or other granular material can be placed in the box 110 and retained therein by lid 511 to provide a suitable weighting factor for the apparatus 100.

In an alternative embodiment, the box 110 can be formed in place as a complete container with inlet and outlets thereto. Thus, a liquid, such as water, can be used for the stabilizing weight effect.

In addition, support webs 122 and 123 are shown incorporated into the struts 105 and 106. These support webs 122 and 123 are angulated within the struts and, on a projected basis, form squares within the apparatus 100. In most cases, the support webs are not as high as the plates of the struts 105 and 106 and are recessed slightly. However, this particular support web arrangement is illustrative only. It is not limitative of the invention and can take other shapes or configurations as desired.

Furthermore, other support webs 125 are shown connected to the support trough 107 to add strength and stability thereto. These supports webs are also shorter than the struts 105 and 106. The number of such supports is a matter of structural strength and design. In the illustrative embodiment, three such supports are shown but any number can be utilized.

Also, support webs 135 are included in the hollow 110. These support webs (which can be shorter than the parallel plates of struts 105 and 106) add support to the boss 510.

Figure 2:
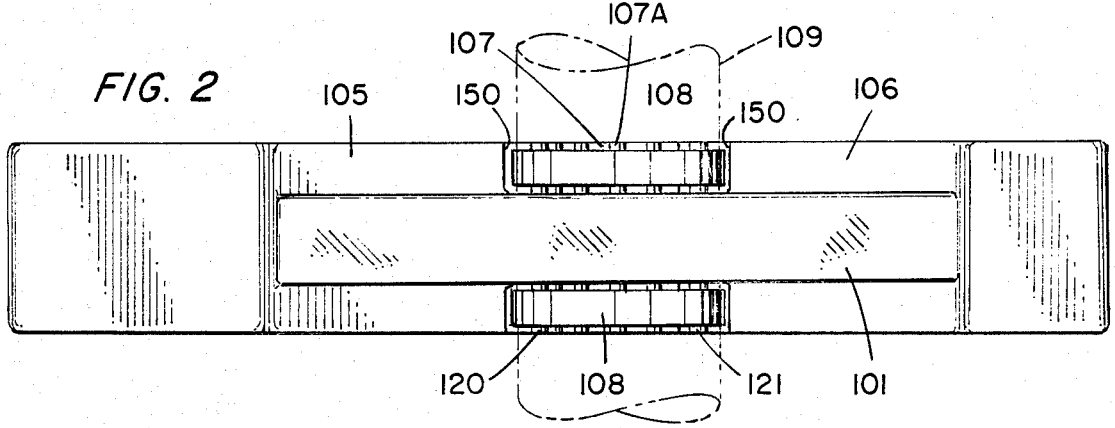
FIG. 2 is a view of one end of the instant invention.

Referring now to FIG. 2, there is shown a bottom (or end) view of the apparatus 100 when viewed from the side rail 101. Thus, the pole 109 (shown in dashed outline) extends therethrough and is supported by trough 107. The clamps 108 retain the pole 109 in place relative to block 100. The ends of struts 105 and 106 include the flat surfaces of 105A and 106A which are visible in FIG. 3. These flat surfaces are, generally, sufficient to provide a support surface for the blocks. Of course, it is expected that the device 100 will be used in pairs with the pole 109 extending therebetween. Thus, the pole 109 will be maintained at a substantially horizontal position at one of four levels which are defined by the device 100.

Figure 3:
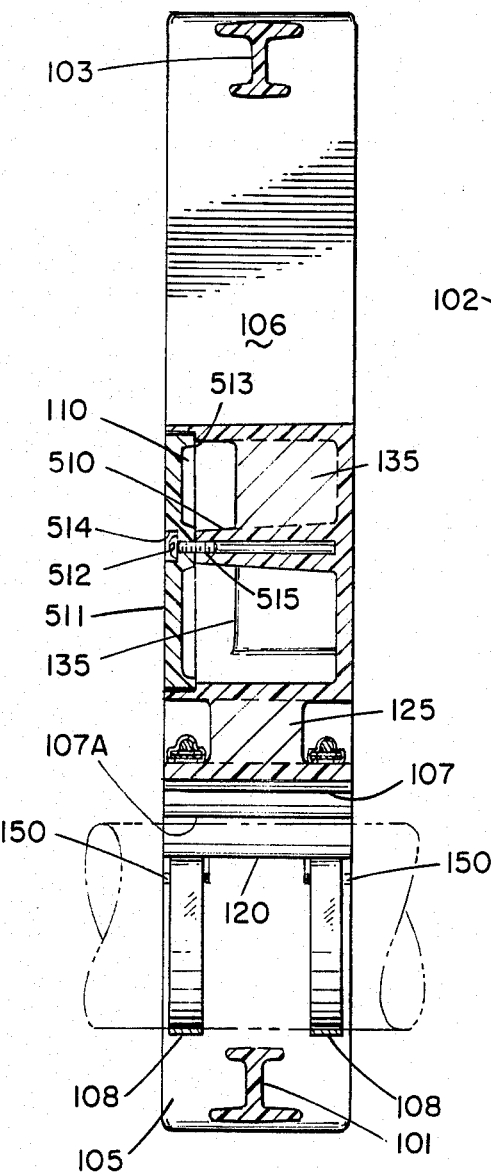
FIG. 3 is a cross-sectional view of the support device of the instant invention taken along the line 3—3 in FIG. 1.

Referring now to FIG. 3, there is shown a cross-sectional view of a preferred embodiment of the instant invention taken along the line 3—3 in FIG. 1. In this embodiment, the bin 110 is formed together with portions of the struts 105 and 106, as discussed above. The internal surface of bin 110 includes a ledge 513 near the top thereof. The outer edge of lid 511 is arranged to rest on and abut with the ledge 513 and the inner surface of bin 110. In addition, a boss 510 is provided at or about the center of the bin 110. The boss 510 extends upwardly from the bottom of the bin 110. A bore 515 is provided in the boss 510. The bore 515 may be slightly tapered in some instances but is not essential.

In addition, lid 511 includes a countersunk bore 514 at approximately the center thereof and arranged to be aligned with the boss 510. When the lid 511 is placed on top of the bin 110, resting on the ledge 513, a self-tapping screw 512 is passed through the countersunk bore 514 into threaded engagement with the internal surface of bore 515 in boss 510. Thus, the lid 511 can be secured to the outer surface of bin 110 in a readily removable arrangement. The granular weight (not shown) is, thus, secured in the bin 510.

Inasmuch as the boss 510 is fabricated of the polypropylene material, as is the remainder of the block 100, the self-tapping screw 512 will easily tap into and engage the bore 515. Moreover, the threaded arrangement can be repetitively provided without seriously damaging the bore.

Figure 4:
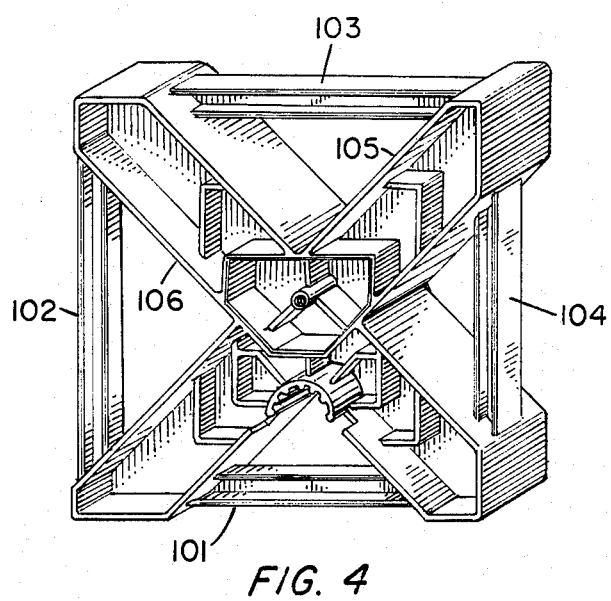
FIG. 4 is a perspective view of the support device of the instant invention.

Referring now to FIG. 4, there is shown a perspective view of the support device 100 of the instant invention. This view is presented to show the arrangement and relationship of some of the components of the system. In FIG. 4, the I-beam configurations of the struts 105 and 106 are displayed. Also, the T-beam configuration of side rails 101-104 are depicted. Likewise, the relationship of the several I-beam or T-beam members is also illustrated.

In addition, the bin or container 110 is shown, as well. The coplanar relationship of the top edges of the sides of bin 110 and the top edges of the struts 105 and 106 is depicted. This relationship permits the block 100 to be flat in storage and to be easily stackable. Also, FIG. 4 shows the relationship of the side rails 101-104 relative to the struts 105 and 106. As described above, the side rails are smaller in heighth and width than the strut. Moreover, FIG. 4 shows how the side rails 101-104 prevent lines from tangling with the ends of the struts 105 and 106. Perhaps, more importantly, the side rails provide tensile strength between the ends of the struts. Therefore, the struts do not spread apart under weighted conditions.

In addition, inasmuch as the space between the struts and sidewalls is, basically, open, the side rails can function as an easy means for gripping and carrying the blocks 100. Inasmuch as the blocks are fabricated of polypropylene, they are relatively light weight and easily transported manually.

Likewise, the various support webs 123, 125 and 135 (and so forth) are illustrated so as to point out the relationships to the several struts and the like. The trough 107 is shown, again in the low or down position. The support webs 125 are connected thereto in order to provide appropriate strength to the unit. In FIG. 4, the pole 109 and the clamps 108 have been omitted for clarity.

The view from the other side of the block 100 is substantially similar except that the bin 110 may encompass the entire width of the struts. Thus, the bottom of the bin 110 may appear as a flat surface.

Figure 5:
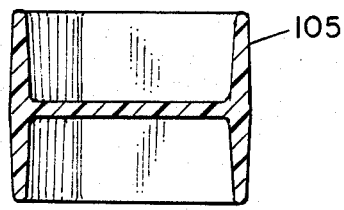
FIG. 5 is a cross-sectional view of the support device of the instant invention taken along the line 4—4 in FIG. 1.

Referring now to FIG. 5, there is shown a cross-sectional view of the strut 105 taken along the line 5—5 in FIG. 1. The cross-sectional view of strut 106, can also have a similar cross-section, as well as side rails 101, 102, 103 and 104, respectively. However, the side rails, typically, have a T-shape wherein the parallel sides have different dimensions. This cross-sectional view is illustrative of a preferred I-beam construction but is not specifically limitative of the invention. The T-beam configuration of the side rails is best seen in FIG. 3.

Figure 6:
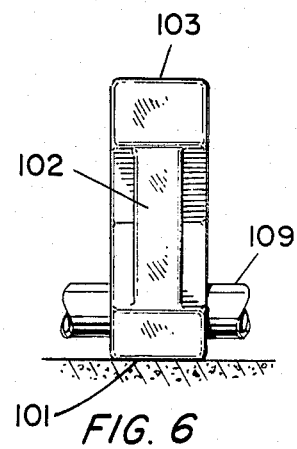
FIG. 6 is is a side view of the support device with the cross-member in the "low position".

Referring now to FIG. 6, it is shown that it is possible to place the cavaletti with the transverse member 109 at the bottom of the support (see aslo FIG. 1). That is, clamp 108 will retain the pole in the trough 107 at the position shown. In this case, the block 100 rests on the surfaces 105A and 106A adjacent to side rail 101. This arrangement is useful in dressage training inasmuch as it allows the horse to pass the cavaletti while walking or trotting. That is, the transverse member 109 can be secured in the matching support troughs of a pair of the side supports 100 to form a cavaletti. The cavaletti according to the invention also have the advantage that they can be turned in such a way that the transverse member lies either on the top or on the side of the diagonal struts, so that four different heighths of transverse member can be realized. Also, it is possible to create an ascending obstacle by using a number of different height cavaletti, if desired.

Figure 7:
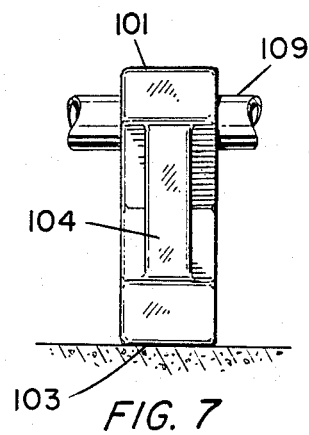
FIG. 7 is a side view of the support device with the cross-member in the "high" position.

As shown in FIG. 7, the degree of training difficulty can be increased by turning the cavaletti supports to one of the three additional positions. The highest position of the cavaletti is shown in FIG. 7. In this case, the block rests on the surfaces 105B and 106B adjacent to side rail 103. The block can be placed on each of the four sides to produce a total of four positions with different heights of the transverse pole. By rotating the block 100 about its center, the support trough 107 moves to different heighth positions and pole 109 is carried thereby. Thus, pole 109 can be selectively raised relative to the surface upon which the device 100 rests (see FIG. 6 and 7).

Thus, there is shown and described a preferred embodiment of a support device which provides varying levels of support for a pole or shaft. While not specifically limited thereto, this device can be used as a horse training device such as a cavaletti or the like.

The present invention provides a pole support which enables a barrier to be readily built and dismantled; which enables the height of the barrier to be varied easily and quickly; which is safe to use; and which can be easily stored and transported.

The device as shown permits four different levels of support for the pole or shaft in question. The device is fabricated of a suitable plastic material although other materials are contemplated. Moreover, the cavaletti according to the invention can be stacked in a wide variety of different ways as a result of the modular construction thereof. The specific angles and configurations which are shown are deemed to be highly desirable and preferrable for this type of device. For example, in the device of the invention, the corners of the block 100 are preferably rounded instead of angled. This is intended to reduce the risk of injury to a horse or rider hitting, or landing on, the block. However, it is understood that other angular arrangements can be provided. In other words, other designs and configurations, as well as modifications to the instant configuration, may be suggested to those skilled in the art. However, any such modifications or changes which fall within the purview of this description are intended to be included therein as well. It is noted that this description is illustrative only and is not intended to be limitative. Rather, the scope of the application is limited only by the claims appended hereto.

I claim:

1. A device for use in supporting one end of an equestrian fence pole comprising,
    a block which has a substantially rectilinear peripheral configuration,
    diagonal struts between pairs of opposite corners of said block, and
    a transverse groove disposed at the intersection of said diagonal struts for receiving one end of the pole,
    said block being dimensioned so that it can be used to support the pole in said transverse groove at one of four different alternative heights by placing the block on a different side thereof.

2. The device recited to claim 1 wherein, said block is fabricated from the group of materials comprising wood or plastic.

3. The device recited in claim 2 wherein, said plastic material comprises a reinforced plastic.

4. The device recited in claim 1 including, clamp means associated with said transverse groove to retain the pole in said transverse groove.

5. The device recited in claim 4 wherein, said clamp means comprises an expandable hose clamp.

6. The device recited in claim 1 including, a plurality of side rails which are connected between the respective ends of said diagonal struts at the corners of said block.

7. The device recited in claim 6 wherein, said plurality of side rails individually having different length.
said plurality of side rails having smaller cross-sectional area than said diagonal struts.

8. The device recited in claim 1 including, a housing formed at said intersection of said diagonal struts.

9. The device recited in claim 8 including, cover means adapted to be mounted over said housing in order to form an enclosure.

10. The device recited in claim 9 including, boss means formed within said housing and adapted to receive a sealing means in order to mount said cover means over said housing.

11. The device recited in claim 10 wherein, said sealing means comprises a threaded means for engaging said boss means.

12. The support device recited in claim 10 wherein, said pair of struts are substantially co-planar 13. The device recited in claim 1 wherein, said diagonal struts each has an I-shaped cross-sectional configuration.

14. The device recited in claim 13 wherein, said plurality of said rails each has a T-shaped cross-sectional configuration.

15. The support device recited in claim 1 wherein, said device is fabricated of polyethylene.

16. The support device recited in claim 1 wherein, said transverse groove is substantially semi-circular in configuration.

17. A support comprising,
a pair of struts which intersect at approximately 90° relative to each other,
said pair of struts each have substantially similar depth, width and length dimensions,
said pair of struts arranged such that the intersection thereof is offset in two directions in the width dimension from the center lines between the ends of each of said pair of struts, and
a plurality of side connectors connected between the respective ends of said pair of struts.

18. The support recited in claim 7 including, trough means disposed at the intersection of said pair of struts between the outer surfaces of said struts.

* * * * *